(12) United States Patent
Punja et al.

(10) Patent No.: US 10,887,531 B2
(45) Date of Patent: Jan. 5, 2021

(54) REPLACING A BACKGROUND PORTION OF AN IMAGE

(71) Applicant: Rovi Guides, Inc., San Jose, CA (US)

(72) Inventors: Deviprasad Punja, Bangalore (IN); Aditya Rautray, Bangalore (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/366,886

(22) Filed: Mar. 27, 2019

(65) Prior Publication Data
US 2020/0314353 A1 Oct. 1, 2020

(51) Int. Cl.
| | |
|---|---|
| H04N 5/272 | (2006.01) |
| G06F 16/583 | (2019.01) |
| G06T 7/194 | (2017.01) |
| G06T 5/50 | (2006.01) |

(52) U.S. Cl.
CPC .......... H04N 5/272 (2013.01); G06F 16/583 (2019.01); G06T 5/50 (2013.01); G06T 7/194 (2017.01)

(58) Field of Classification Search
None
See application file for complete search history.

(56) References Cited

U.S. PATENT DOCUMENTS

| | | | |
|---|---|---|---|
| 6,643,387 B1 | 11/2003 | Sethuraman et al. | |
| 6,912,313 B2 | 6/2005 | Li | |
| 7,872,669 B2 | 1/2011 | Darrell et al. | |
| 8,131,118 B1 | 3/2012 | Jing et al. | |
| 8,823,739 B2 | 9/2014 | Baron, Jr. et al. | |
| 9,342,927 B2 | 5/2016 | Adhikari et al. | |
| 9,460,123 B1* | 10/2016 | Strutt | G06F 16/5838 |
| 2006/0170669 A1* | 8/2006 | Walker | H04N 1/00352 |
| | | | 345/418 |
| 2007/0275736 A1 | 11/2007 | Baek | |
| 2008/0201638 A1 | 8/2008 | Nair | |
| 2008/0246777 A1 | 10/2008 | Swanson et al. | |
| 2009/0279794 A1 | 11/2009 | Brucher et al. | |

(Continued)

OTHER PUBLICATIONS

Li et al., "Location Recognition Using Prioritized Feature Matching," Oct. 5, 2010, 11th European Conference on Computer Vision, ECCV 2010 [Lecture Notes in Computer Science] pp. 791-408.

(Continued)

Primary Examiner — Jason A Pringle-Parker
(74) Attorney, Agent, or Firm — Haley Guiliano LLP

(57) ABSTRACT

Systems and methods are described for replacing a background portion of an image. An illustrative method includes receiving a first image, identifying a background portion of the first image and a subject portion of the first image, retrieving metadata associated with the first image, determining, based on the metadata, a geographic location where the first image was captured, retrieving a plurality of other images captured at the geographic location, selecting a second image from the plurality of other images, wherein the second image is associated with metadata indicating that the second image was captured during a predetermined time period, and generating for display a third image comprising the subject portion of the first image placed over the second image.

20 Claims, 9 Drawing Sheets

(56) References Cited

U.S. PATENT DOCUMENTS

| | | | |
|---|---|---|---|
| 2009/0315915 A1* | 12/2009 | Dunn | H04N 5/2621 |
| | | | 345/632 |
| 2010/0149399 A1 | 6/2010 | Mukai et al. | |
| 2012/0224787 A1 | 9/2012 | Imai | |
| 2013/0016123 A1* | 1/2013 | Skarulis | G09G 5/00 |
| | | | 345/633 |
| 2013/0094780 A1 | 4/2013 | Tang et al. | |
| 2013/0107038 A1 | 5/2013 | Ota et al. | |
| 2013/0113827 A1 | 5/2013 | Forutanpour et al. | |
| 2013/0128059 A1 | 5/2013 | Kristensson | |
| 2013/0129142 A1 | 5/2013 | Miranda-Steiner | |
| 2013/0286223 A1* | 10/2013 | Latta | H04N 1/00347 |
| | | | 348/207.1 |
| 2015/0117794 A1* | 4/2015 | Murphy-Chutorian | ...... |
| | | | G06T 7/73 |
| | | | 382/284 |
| 2016/0063735 A1 | 3/2016 | Furuya | |
| 2017/0142371 A1 | 5/2017 | Barzuza et al. | |
| 2017/0171471 A1 | 6/2017 | Wang | |
| 2017/0256040 A1 | 9/2017 | Grauer | |
| 2017/0337738 A1 | 11/2017 | Kepner et al. | |
| 2019/0295216 A1 | 9/2019 | Suitoh | |
| 2019/0378192 A1 | 12/2019 | Fox | |

OTHER PUBLICATIONS

PCT International Search Report for International Application No. PCT/US2020/025457, dated May 29, 2020 (17 pages).

\* cited by examiner

| Image | Location | Landmark(s) |
|---|---|---|
| 1 | New York | Times Square |
| 2 | New York | Statue of Liberty, Ellis Island |
| 3 | Paris | Eiffel Tower, Palais de Chaillot |
| 4 | Paris | Louvre Museum, Tuileries Gardens |
| 5 | London | Buckingham Palace, Victoria Memorial |
| 6 | London | Hyde Park, Albert Memorial |
| 7 | Quebec | Chateau Frontenac |
| 8 | Quebec | Quartier Petit Champlain |

REPLACING A BACKGROUND PORTION OF AN IMAGE

BACKGROUND

The present disclosure relates to modifying a portion of an image, and more particularly, to methods and systems for replacing a background portion of an image.

SUMMARY

Throughout the ages, people have desired to have their picture taken. In earlier times, the rich and famous would have their portrait painted. With the development of photography, the ability to take their own pictures was given to the masses, and the introduction of the digital camera in particular has enabled everybody to capture and view images, as well as edit the images with the use of a computing device. Users no longer need a professional to take their picture or to alter their images. Removing "red eyes" from a family picture, "airbrushing" an image for a publication, and cropping or sizing an image for a particular format or aspect ratio are common forms of image editing (often referred to as "touch-ups") used every day, and software algorithms have been developed to perform these functions automatically with the press of a button. With the introduction of the camera phone, everybody now has a camera in their pocket and a few thousand (or more) images stored thereon or on another device.

Users now spend a considerable amount of time viewing and sharing images they have captured, and various image-publishing and -sharing platforms have grown incredibly popular. Users generally, and users of these platforms in particular, capture, edit, and post millions of images every day and are increasingly seeking to enhance their images or make the images appear more interesting. One such enhancement that users often wish to perform is replacing the background of an image with either a newer image of the same location where the original image was taken, or a historical image of that location. However, the users may not know or remember where a particular image was captured, and even if they do know the location where the original image was captured, they may not be able to find a suitable image with which to replace the background of the original image without the resulting new image having an undesirable appearance.

To overcome such problems, methods and systems are described herein for automatically replacing a background portion of an image. In particular, the embodiments described herein provide for using various image-processing algorithms and techniques to automatically identify the object of the image (e.g., a person or other object that is the focus, and is usually in the foreground, of the image) and the background of the image (e.g., the scene or location in front of, or within, which the object of the image is depicted). The geographic location of the background is then determined (e.g., based on metadata associated with the image or based on identification of an object included in the background of the image), and other images of the same geographic location retrieved. In some embodiments, the other images of the same geographic location may be from a specified or predetermined time period. For example, if the original image is an old image, current images of the same geographic location may be retrieved. In another embodiment, older or historical images of the same geographic location may be retrieved. One of the retrieved images is then selected, and the object portion of the original image overlaid onto the background portion of the selected image.

In some embodiments, the relative size of the object portion to the background portion, orientation, aspect ratio, resolution, lighting conditions, and/or other parameters of the original image may be determined, and the selection of one of the retrieved images of the same geographic location may be based on a degree of matching between the parameters of the original image and the retrieved images. The parameters may be ranked, and an image having a higher degree of matching to some parameters may be selected over an image with a higher degree of matching of other parameters. For example, relative size and lighting conditions may be ranked higher than orientation and aspect ratio, and thus an image with similar lighting conditions and in which the relative size of the background is similar to the original image will be selected over an image in which those parameters don't match but the other parameters do match.

The methods and systems described herein provide an improved process for replacing the background portion of an image and generating a new image that has a desirable appearance to the user. The process increases the efficiency of replacing the background portion of an image both for the user and for the computing resources needed to perform the processes described herein. To that end, the methods and systems provide for selecting a replacement image for the background portion based on a matching of geographic location and visual parameters of the original and replacement images in order to generate an image that is visually realistic and not evidently computer-generated and reduces or eliminates additional editing needed to make the image's appearance desirable to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
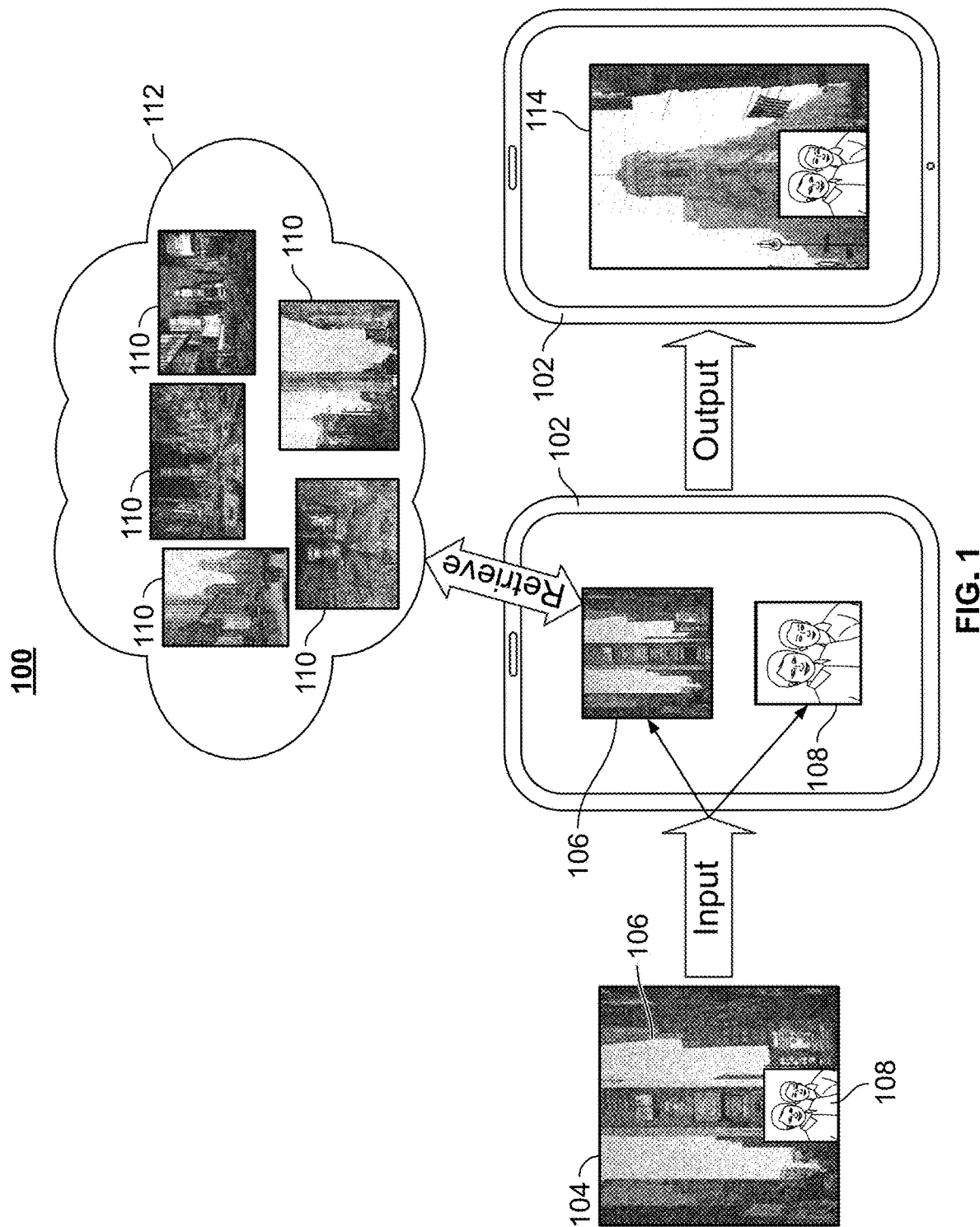
FIG. 1 shows an illustrative scenario for replacing a background portion of an image, in accordance with some embodiments of the disclosure.

FIG. 1 shows an illustrative scenario 100 for replacing a background portion of an image. In FIG. 1, a media device 102 receives as input an image 104. The image 104 includes a background portion 106 and a subject portion 108. The media device 102 identifies the background portion 106 and the subject portion 108 of the image 104, determines a geographic location corresponding to the background portion 106 of the image 104, and retrieves, from a database 112, one or more other images 110 captured at or depicting the same geographic location as the background portion 106 of the image 104. The media device 102 then selects one of the other images 110 and generates for display a new image 114 of the subject portion 108 of the image 104 placed onto the selected other image 110.

The media device 102 may be any device on which images can be displayed, such as a smartphone, a personal computer (PC), a laptop computer, a tablet computer, a handheld computer, a personal digital assistant (PDA), a smart television (TV), a streaming media device, a WebTV box, a personal computer television (PC/TV), a wearable computer, an automotive media system, and/or any other computing equipment on which images can be displayed. As described further below, the media device 102 is configured to display a graphical user interface (GUI) that shows the new image 114 and may further show the original image 104.

The image 104 may be any digital image stored in any format known to those skilled in the art. For example, the image 104 may be a still image or photograph, a moving image, a video, a three-dimensional image, a stereoscopic image, etc. The background portion 106 of the image 104 is a portion or area of the image 104 that is not the subject of the image 104. For example, the background portion 106 may be a portion of the image 104 depicting a scene behind or around the subject of the image 104. It then follows that the subject portion 108 of the image 104 is a portion or area of the image 104 depicting the subject of the image 104. In one example embodiment, the subject of the image 104 is a person standing in famous location, such as Times Square, N.Y. In this embodiment, the portion of the image 104 depicting the person is the subject portion 108, and the remainder of the image 104 (e.g., the portion of the image showing the buildings, streets, vehicles, billboards, and other people who are not the subject person) is the background portion 106. In another example embodiment, the subject of the image 104 is a group of people standing on the Brooklyn Bridge. In this embodiment, the portion of the image 104 depicting the group of people is the subject portion 108, and the remainder of the image 104 (e.g., the portion of the image showing the Brooklyn Bridge and other surroundings, at least a part of which may be underneath and/or in front of the group of people) is the background portion 106. Those skilled in the art will recognize that the subject portion 108 of the image 104 need not be the "foreground" of the image 104 and may instead be in the middle of the image 104—that is, at least a portion of the background portion 106 of the image 104 may be in front of the subject portion 108 of the image 104.

The other images 110 captured at or depicting the same geographic location as the image 104 may similarly be any digital images stored in any format known to those skilled in the art. The set of other images 110 may be identified based on metadata and/or image analysis and may depict the geographic location during a predetermined or user-selected time period, as described further below with reference to FIGS. 4-8. Likewise, the new image 114 may be a digital image stored in any format known to those skilled in the art. As with the image 104, the other images 110 and new image 114 may be still images or photographs, moving images, videos, three-dimensional images, stereoscopic images, etc.

Figure 2:
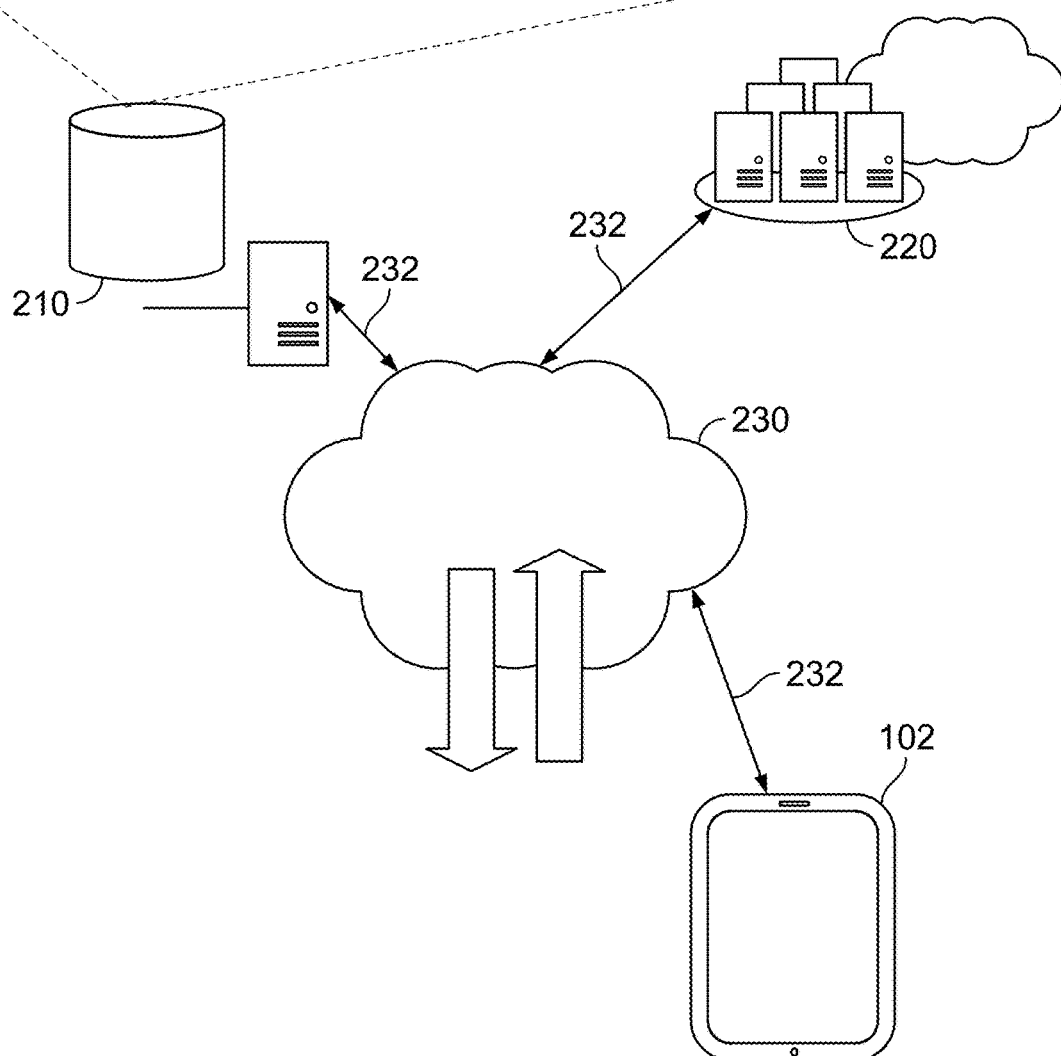
FIG. 2 shows an illustrative system for replacing a background portion of an image, in accordance with some embodiments of the disclosure.

FIG. 2 shows an illustrative system for replacing a background portion of an image. In particular, FIG. 2 shows a system 200 where the media device 102 retrieves the other images 110 and/or the metadata associated with the other images 110 from a content source 210 via a communications path 232. The content source 210 may be any server or other computing device from which other images 110 and/or related metadata associated with the other images 110 may be retrieved. For example, the content source 210 may be a cloud storage platform by means of which images are collected, stored, and distributed, and from which a media device 102 may retrieve the other images 110. In that regard, the communications path 232 may be any network or communication equipment or medium by means of which the media device 102 can communicate with (e.g., submit a query to and/or retrieve data or content from) the content source 210. In one illustrative example, the communications path 232 includes devices connected via the Internet.

An image-matching application may be implemented on any one or a combination of the media device 102, the content source 210, and/or an application server 220, each of which may function as a stand-alone device or may be part of a network of devices. Various network configurations of devices may be implemented and are discussed in more detail below. In the system 200, there may be multiple media devices 102, but only one is shown in FIG. 2 to avoid overcomplicating the drawing. In addition, multiple users may each utilize more than one type of media device 102 and also more than one of each type of media device 102, as described above.

The media device 102 may be coupled to a communication network 230. The communication network 230 may be one or more networks including the Internet, mobile phone network, mobile voice or data network (e.g., a 4G or LTE network), cable network, public switched telephone network, or other types of communication network or combinations of communication networks. The media device 102, the content source 210, and the application server 220 may be connected to the communication network 230 via one or more communications paths 232, such as a satellite path, a fiber-optic path, a cable path, a path that supports Internet communications (e.g., IP), free-space connections (e.g., for wireless signals), and/or any other suitable wired or wireless communications path or combination of such paths.

Although communications paths 232 are not drawn directly between the media device 102 and the content source 210 or the application server 220, these devices may communicate directly with each other via communications paths 232, such as short-range point-to-point communications paths, for example USB cables, IEEE 1394 cables, wireless paths (e.g., BLUETOOTH, infrared, IEEE 802-11x, etc.), or other short-range communication via wired or wireless paths. BLUETOOTH is a certification mark owned by Bluetooth SIG, INC. The devices may also communicate with each other directly through an indirect path via the communication network 230.

The system 200 may include more than one content source 210, but only one is shown in FIG. 2 to avoid overcomplicating the drawing. The content source 210 includes a database, table, or other data structure, (referred to hereinafter as database 212) storing a list of each image on the content source 210, and/or data indicating a geographic location where the image was captured or that is depicted in the image, and one or more landmarks associated with the geographic location. In some embodiments, the landmarks are at least partially depicted in the corresponding images. As shown in FIG. 2, the database 212 includes entries for images 1-8. Image 1 is associated with the location New York and the landmark Times Square. Image 2 is associated with the location New York and the landmarks Statue of Liberty and Ellis Island. Image 3 is associated with the location Paris and the landmarks Eiffel Tower and Palais de Chaillot. Image 4 is associated with the location Paris and the landmarks Louvre Museum and Tuileries Gardens. Image 5 is associated with the location London and the landmarks Buckingham Palace and Victoria Memorial. Image 6 is associated with the location London and the landmarks Hyde Park and Albert Memorial. Image 7 is associated with the location Quebec and the landmark Chateau Frontenac. Image 8 is associated with the location Quebec and the landmark Quartier Petit Champlain. Those skilled in the art will appreciate that the images and associated locations and landmarks shown in FIG. 2 are merely examples, and that the database 212 may include additional entries for other images with other locations and/or landmarks, and/or additional or different entries for landmarks associated with each of the locations shown in FIG. 2.

The content source 210 may store the data included in the database 212 as metadata associated with corresponding images. The metadata may include the location and/or landmarks associated with each image. The content source 210, either in the database 212 or in a separate data structure, also stores the images referred to in the database 212, or stores links (e.g., hyperlinks, addresses, credentials, etc.) to access the images referred to in the database 212 on a separate device or server (not shown in FIG. 2).

The image-matching application may be, for example, a stand-alone application implemented on the media device 102 described above. For example, the image-matching application may be implemented as software or a set of executable instructions which may be stored in storage 308 (described below with reference to FIG. 3) and executed by control circuitry 304 (described below with reference to FIG. 3) of the media device 102. In some embodiments, the image-matching application is a client/server-based application where only a client application resides on the media device 102, and a server application resides on the application server 220. For example, an image-matching application may be implemented partially as a client application on the control circuitry 304 of the media device 102 and partially on the application server 220 as a server application running on the control circuitry 304 of the application server 220. When executed by the control circuitry 304 of the application server 220, the image-matching application may instruct the control circuitry 304 of the media device 102 to transmit the image 104 and/or the background portion 106 of the image 104 to the application server 220, which then determines the geographic location where the image 104 was captured or the geographic location corresponding to the background portion 106 of the image 104, and transmits the identified geographic location back to the media device 102. The media device 102 may then query the content source 210 and/or the database 212 for other images 110 captured at or depicting the identified geographic location, as described further below with reference to FIGS. 4-8.

While system 200 is shown in FIG. 2 as including only the media device 102, the content source 210, and the application server 220, those skilled in the art will appreciate that the system 200 may further include various other devices. In some embodiments, the media device 102 may operate in a cloud computing environment to access cloud services. In a cloud computing environment, various types of computing services for content sharing, storage, or distribution are provided by a collection of network-accessible computing and storage resources, referred to as "the cloud." The media device 102 may be a cloud client that relies on cloud computing for application delivery, or the media device 102 may have some functionality without access to cloud resources. For example, some applications running on the media device 102, such as the image-matching application, may be cloud applications, that is, applications delivered as a service over the Internet, while other applications may be stored and run on the media device 102. In some embodiments, the media device 102 uses cloud resources for processing operations, such as the processing operations performed by the processing circuitry 306 described in relation to FIG. 3. For example, the media device 102 may rely on the application server 220 and/or another cloud resource to identify the geographic location associated with the image 104 and/or the background portion 106, and retrieve the other images 110 from the content source 210 and/or another cloud resource.

Figure 3:
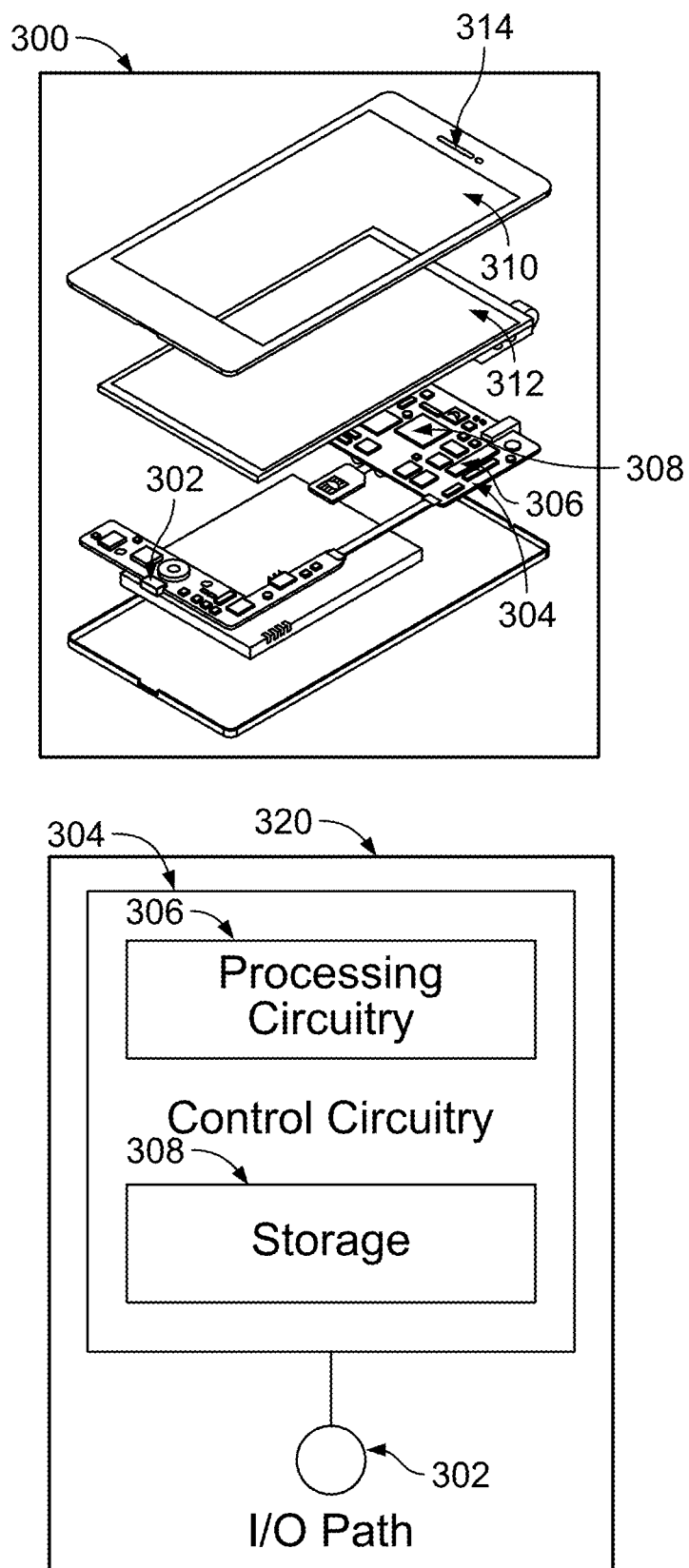
FIG. 3 shows a diagram of illustrative devices of the system of FIG. 2, in accordance with some embodiments of the disclosure.

FIG. 3 shows a generalized embodiment of an illustrative media device 300. As depicted, the media device 300 may be a smartphone or tablet. The media device 300 may receive content and data via an input/output (hereinafter "I/O") path 302. The I/O path 302 may provide user input, user preferences, the image 104, other images 110, and/or metadata related to any of the aforementioned to control circuitry 304, which includes processing circuitry 306 and storage 308. The control circuitry 304 may send and receive commands, requests, and other suitable data using the I/O path 302. The I/O path 302 may connect the control circuitry 304 (and specifically the processing circuitry 306) to one or more communications paths (described below). I/O functions may be provided by one or more of these communications paths but a single path is shown in FIG. 3 to avoid overcomplicating the drawing.

The control circuitry 304 may be based on any suitable processing circuitry, such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, the control circuitry 304 executes instructions for an image-matching application stored in memory (i.e., the storage 308). Specifically, the control circuitry 304 may be instructed by the image-matching application to identify a geographic location where the image 104 was captured and/or the geographic location depicted in the background portion 106, to identify other images 110 captured at or depicting the same geographic location, and/or perform the other functions described above and below.

In client/server-based embodiments, the control circuitry 304 includes communications circuitry suitable for communicating with an image-matching application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths. In addition, the communications circuitry may include circuitry that enables peer-to-peer communication of media devices, or communication of media devices in locations remote from each other.

The memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, or any other suitable fixed or removable storage devices, and/or any combination of the same. Nonvolatile memory may also be used. Cloud-based storage, described in relation to FIG. 2, may be used to supplement the storage 308 or instead of the storage 308.

The circuitry described herein may execute instructions included in software running on one or more general purpose or specialized processors. Multiple circuits may be provided to handle simultaneous processing functions. If the storage 308 is provided as a separate device from the media device 300, the circuitry may be associated with the storage 308.

A user may send instructions to the control circuitry 304 using a user input interface 310 of the media device 300. The user input interface 310 may be any suitable user interface, such as a remote control, mouse, trackball, keypad, keyboard, touchscreen, touchpad, stylus input, joystick, or other user input interfaces. Display 312 may be a touchscreen or touch-sensitive display. In such circumstances, user input interface 310 may be integrated with or combined with the display 312. A camera, microphone, or other visual or voice recognition interface may also be used to receive user input. Speakers 314 may be provided as integrated with other elements of the media device 300.

The image-matching application may be implemented using any suitable architecture. For example, it may be a stand-alone application wholly implemented on the media device 300. The image-matching application and/or any instructions for performing any of the embodiments discussed herein may be encoded on computer-readable media. Computer-readable media include any media capable of having computer-executable instructions encoded thereon that, when executed by a processor, cause a device, such as media device 300, to perform the instructed operations. In some embodiments, the image-matching application is a client/server-based application. Data for use by a thick or thin client implemented on the media device 300 is retrieved on demand by issuing requests to a server remote from the media device 300, as described above. Those skilled in the art will appreciate that the media device 102 of FIG. 1 may be implemented as the media device 300 of FIG. 3.

Figure 4:
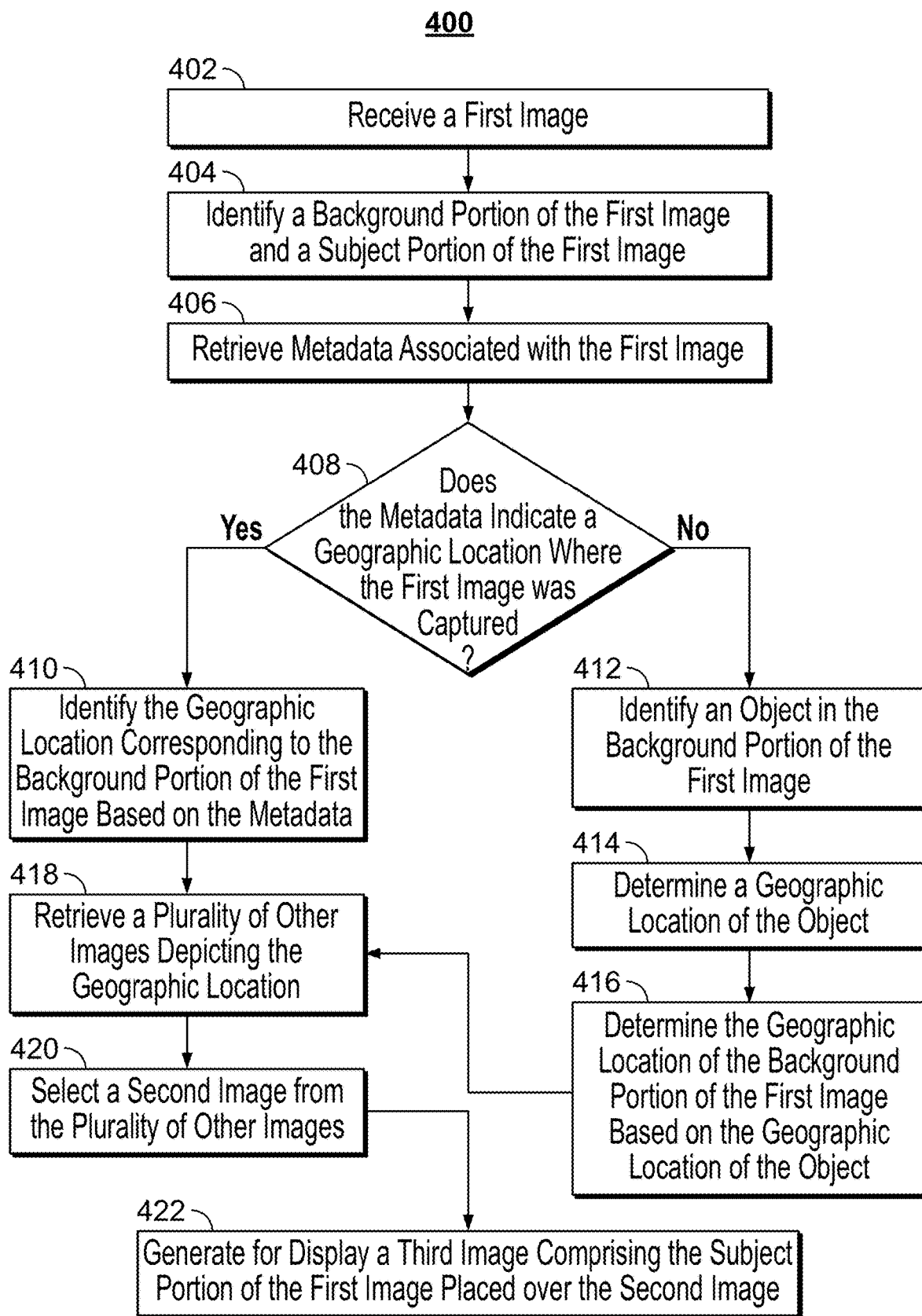
FIG. 4 is a flowchart of an illustrative process for replacing a background portion of an image, in accordance with some embodiments of the disclosure.

FIG. 4 is a flowchart of an illustrative process for replacing a background portion of an image, in accordance with some embodiments of the disclosure. A process 400 for replacing a background portion of an image may begin at block 402, where control circuitry, such as the control circuitry 304, receives a first image, such as the image 104. For example, the control circuitry 304 of the media device 102 may receive an input of the image 104 and/or a user selection, such as via user input interface 310, of the image 104.

At block 404, the control circuitry 304 identifies a background portion, such as the background portion 106, of the image 104, and a subject portion, such as the subject portion 108, of the image 104. For example, the control circuitry 304 may use various algorithms, such as chroma keying, image segmentation, object identification and classification, computer vision, etc., to identify a focus or subject portion 108 of the image 104 and separate that from the remainder of the image 104, which would form the background portion 106.

At block 406, the control circuitry 304 retrieves metadata associated with the image 104. In some embodiments, the metadata is embedded within the file containing the image 104, and the control circuitry 304 extracts the metadata from the image file. In other embodiments, the metadata is stored separately from the image 104, and the control circuitry 304 may retrieve the metadata associated with the image 104 from storage.

At block 408, the control circuitry 304 determines whether the metadata indicates a geographic location where the image 104 was captured. For example, the control circuitry 304 may parse the data included in the metadata associated with the image 104 to determine whether the metadata includes a geotag, coordinates, or other indicator of the location where the image 104 was captured. In response to determining that the metadata indicates the geographic location where the image 104 was captured, the process 400 proceeds to block 410. In response to determining that the metadata does not indicate the geographic location where the image 104 was captured, the process 400 proceeds to block 412.

At block 410, the control circuitry 304 identifies the geographic location corresponding to the background portion 106 of the image 104 based on the metadata. For example, the control circuitry 304 may extract the indicator of the geographic location where the image 104 was captured from the metadata retrieved at block 406, and associate that geographic location with the background portion 106 of the image 104.

At block 412, the control circuitry 304 identifies an object in the background portion of the image 104. For example, the control circuitry 304 may identify a landmark, point of interest, and/or other known object in the image 104. In some embodiments, the control circuitry 304 uses computer vision and/or other pattern-recognition or object-identification techniques to identify the object in the image. In some embodiments, the control circuitry 304 may compare an area (of the background portion 106 of the image 104) that includes an object to a database of images of known objects to determine if there is a match, and if so, identify the object based on the matching image from the database. In other embodiments, the control circuitry 304 may identify a pattern in the background portion 106 of the image 104 and compare the pattern to a database of known patterns in order to identify an object corresponding to the pattern.

At block 414, the control circuitry 304 determines a geographic location of the object. For example, the control circuitry 304 may retrieve the geographic location of the object from a database and/or metadata associated with the matching image found at block 412.

At block 416, the control circuitry 304 determines the geographic location of the background portion 106 of the image 104 based on the geographic location of the object. For example, the control circuitry 304 may associate the geographic location of the object, as determined at block 414, with the background portion 106 of the image 104.

At block 418, the control circuitry 304 retrieves a plurality of other images 110 depicting the geographic location of the background portion 106 of the image 104. For example, the control circuitry may retrieve from a database, such as the database 212, one or more other images 110 that were captured at the geographic location. In some embodiments, the plurality of other images 110 depict the geographic location during a specified or predetermined time period. For example, if the user wants to replace the background portion 106 of the image 104 with a more current background of the same geographic location, the control circuitry 304 may retrieve only images that were recently captured at the geographic location. Alternatively, if the user wants to replace the background portion 106 of the image 104 with a historical image of the geographic location, the control circuitry 304 may retrieve only images that depict the geographic location during the specified time period. Further details on how the control circuitry 304 retrieves the plurality of other images 110 are described below with reference to FIG. 5.

At block 420, the control circuitry 304 selects a second image from the plurality of other images 110. For example, the control circuitry 304 may compare various parameters, such as scale, orientation, point of view, aspect ratio, lighting conditions, weather conditions, time of day, etc., of the other images 110 to the parameters of the image 104 to determine which of the other images 110 is the preferred image to use to replace the background portion 106 of the image 104. Further details on how the control circuitry 304 selects the second image from the plurality of other images 110 are described below with reference to FIGS. 6 and 7.

At block 422, the control circuitry 304 generates for display a new image comprising the subject portion 108 of the image 104 placed over the second image selected at block 420. For example, the control circuitry 304 may overlay the subject portion 108 of the image 104 onto the second image to generate the new image. In some embodiments, the control circuitry 304 identifies an object, point of interest, or landmark associated with the geographic location of the image 104 and determines whether that object, point of interest, or landmark is depicted in the second image. If the object, point of interest, or landmark is depicted in the second image, the control circuitry 304 may determine a position of the object, point of interest, or landmark in the second image, and place the subject portion 108 of the image 104 over the second image in a manner or position such that the subject portion 108 of the image 104 does not obscure the position of the object, point of interest, or landmark in the second image. For example, if the image 104 is an image of a person standing in front of the Eiffel Tower, the control circuitry 304 will determine the position of the Eiffel Tower in the second image, and place the portion of the image 104 including the person over the second image such that it does not obscure the Eiffel Tower in the second image. Further details on how the control circuitry 304 generates the new image are described below with reference to FIG. 8.

Figure 5:
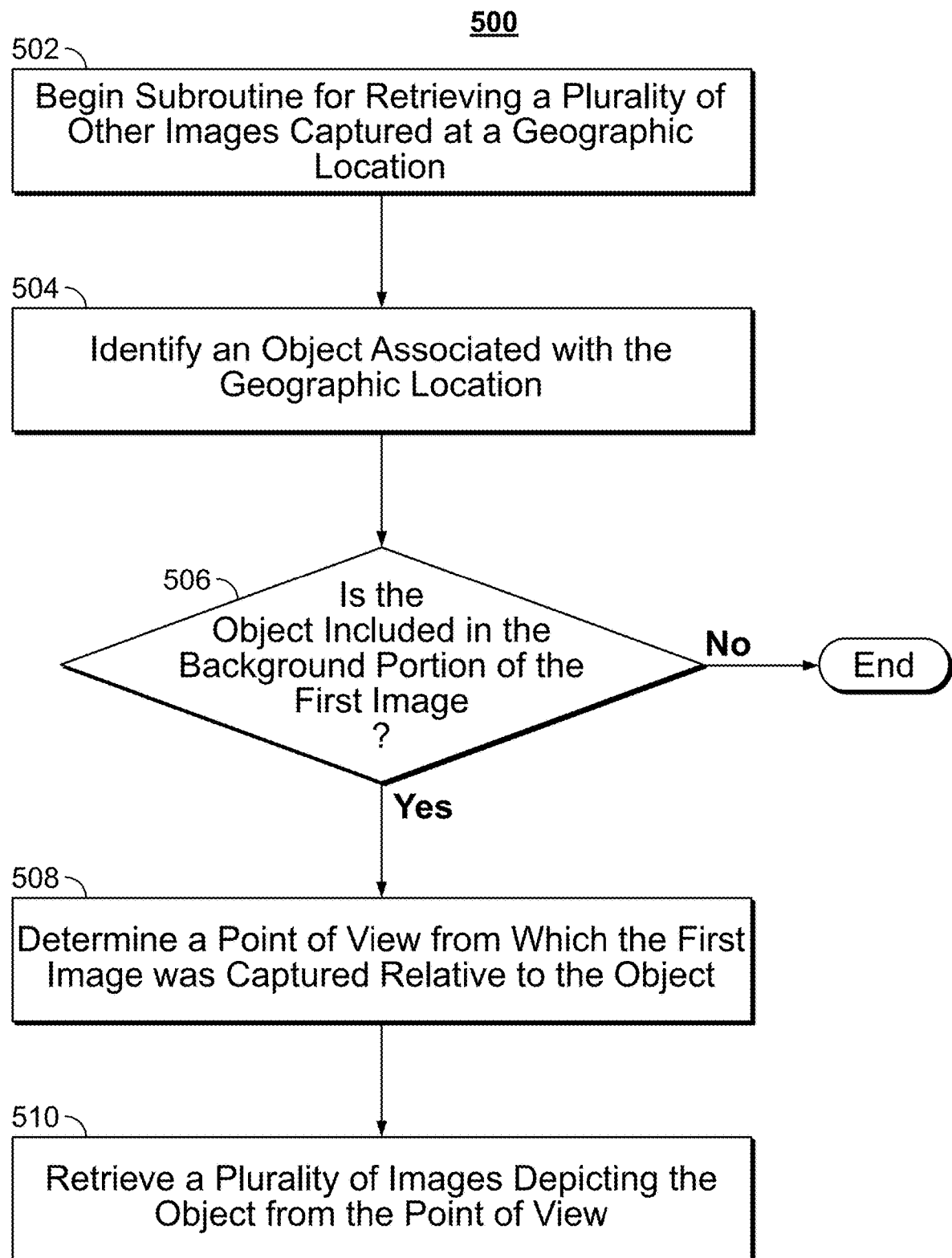
FIG. 5 is a flowchart of a detailed illustrative process for retrieving a plurality of other images captured at a geographic location, in accordance with some embodiments of the disclosure.

FIG. 5 is a flowchart of a detailed illustrative process for retrieving a plurality of other images 110 captured at a geographic location, in accordance with some embodiments of the disclosure. A process 500 for retrieving a plurality of other images 110 captured at a geographic location may begin at block 502. At block 504, the control circuitry 304 identifies an object associated with the geographic location. For example, the control circuitry 304 may retrieve, from a database such as the database 212, a landmark, point of interest, or other known object associated with the geographic location.

At block 506, the control circuitry 304 determines whether the object identified at block 502 is included in the background portion 106 of the image 104. For example, the control circuitry 304 may employ image-processing and/or computer-vision algorithms and techniques, such as the algorithms and techniques described above, to determine whether the object is depicted in the background portion 106 of the image 104. If the object is not included in the background portion 106, the process 500 ends. If the object is included in the background portion 106 of the image 104, the process 500 proceeds to block 508.

At block 508, the control circuitry 304 determines a point of view from which the image 104 was captured relative to the object. For example, the control circuitry 304 may determine a size of the object, angle of the object, and/or position of the object in order to determine the point of view from which the image 104 was captured relative to the object.

At block 510, the control circuitry 304 retrieves a plurality of images depicting the object from the point of view determined at block 508. For example, the control circuitry 304 may identify a plurality of other images 110 depicting the object, and may compare the size, angle, and/or position of the object in one or more of the other images 110 in order to determine the point of view of the object in the one or more other images 110. The control circuitry 304 may then retrieve only those other images 110 that depict the object from a similar point of view as in the image 104.

Figure 6:
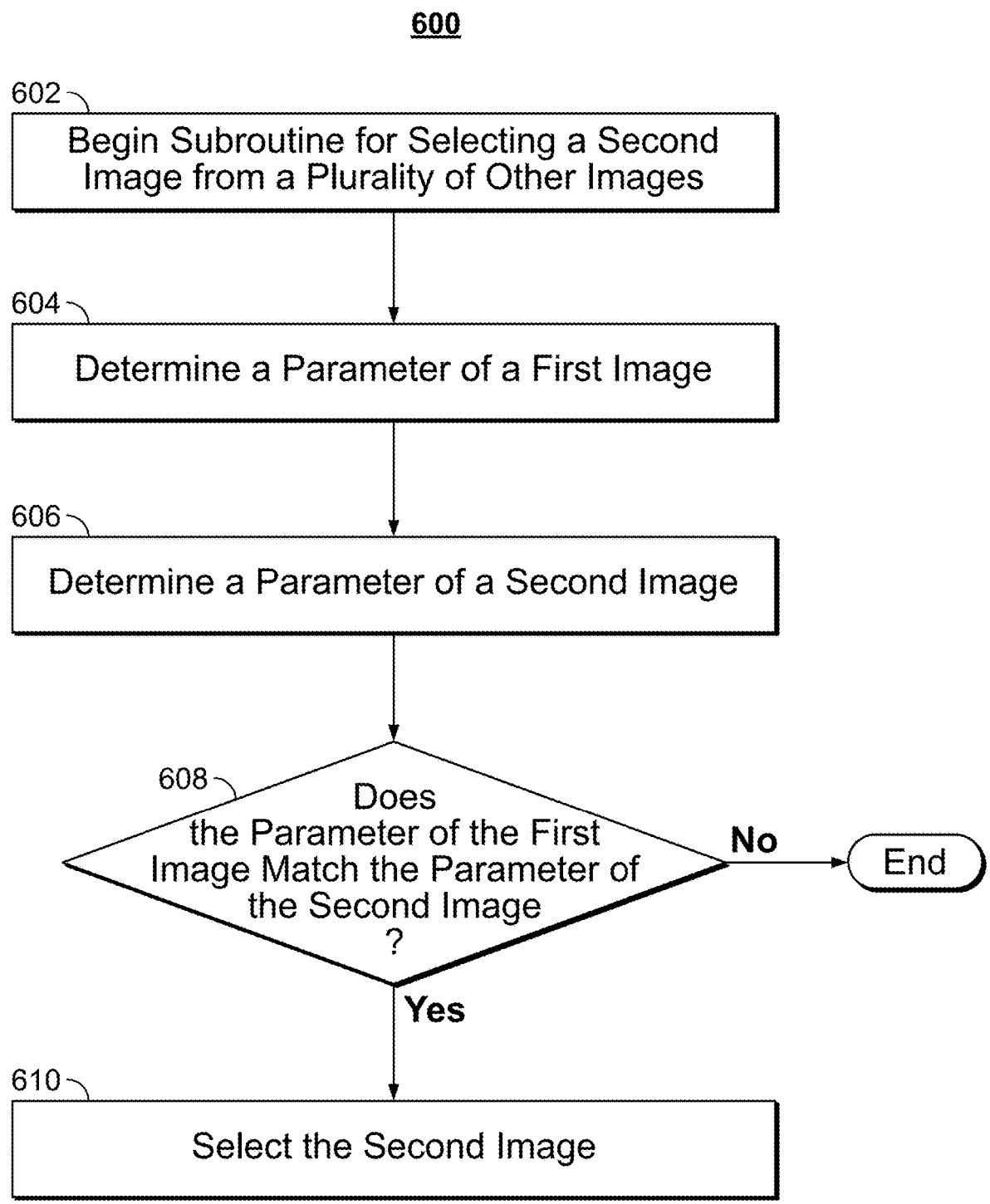
FIG. 6 is a flowchart of a detailed illustrative process for selecting a second image from a plurality of other images, in accordance with some embodiments of the disclosure.

FIG. 6 is a flowchart of a detailed illustrative process for selecting a second image from a plurality of other images 110, in accordance with some embodiments of the disclosure. A process 600 for selecting a second image from a plurality of other images 110 may begin at block 602. At block 604, the control circuitry 304 determines a parameter of the image 104. The parameter of the image 104 may include a time of day during which the image 104 was captured, weather conditions present when the image 104 was captured, lighting conditions of the image 104, an orientation (e.g., portrait, landscape) of the image 104, a resolution of the image 104, an aspect ratio of the image 104, a point of view from which the image 104 was captured, and/or a size of an object in the background portion 106 of the image 104. For example, the control circuitry 304 may determine the time of day during which the image 104 was captured based on metadata associated with the image 104. The control circuitry 304 may determine the weather conditions present when the image 104 was captured by retrieving, from a database, data regarding the weather conditions present on the day and/or at the time when the image 104 was captured. The control circuitry 304 may further determine the weather conditions present when the image 104 was captured via image-processing techniques, such as object identification. For example, if the control circuitry 304 identifies rain or umbrellas in the image 104, the control circuitry 304 may determine that it was raining at the time the image 104 was captured. The control circuitry 304 may determine the lighting conditions of the image 104 by image-processing techniques to determine the brightness, color, and/or contrast of particular portions of the image 104. The control circuitry 304 may determine the orientation, resolution, and/or aspect ratio of the image 104 based on metadata associated with the image 104.

At block 606, the control circuitry 304 determines a parameter of a second image, for example, one of the other images 110. In some embodiments, the control circuitry 304 determines the same parameter of the second image as the parameter of the image 104 determined at block 604.

At block 608, the control circuitry 304 determines whether the parameter of the image 104, as determined at block 604, matches the parameter of the second image, as determined at block 606. For example, the control circuitry 304 may compare the parameter determined at block 604 to the parameter determined at block 606. In response to determining that the parameter of the image 104 does not match the parameter of the second image, the process 600 ends. In response to determining that the parameter of the image 104 matches the parameter of the second image, the process 600 proceeds to block 610.

At block 610, the control circuitry 304 selects the second image. For example, the control circuitry 304 may repeat blocks 604-608 for each image of the plurality of other images 110 until it determines, at block 608, that the parameter of the image 104 matches the parameter of a given image of the plurality of other images 110. The control circuitry 304 may then select the given image of the plurality of other images 110 as the second image.

Figure 7A:
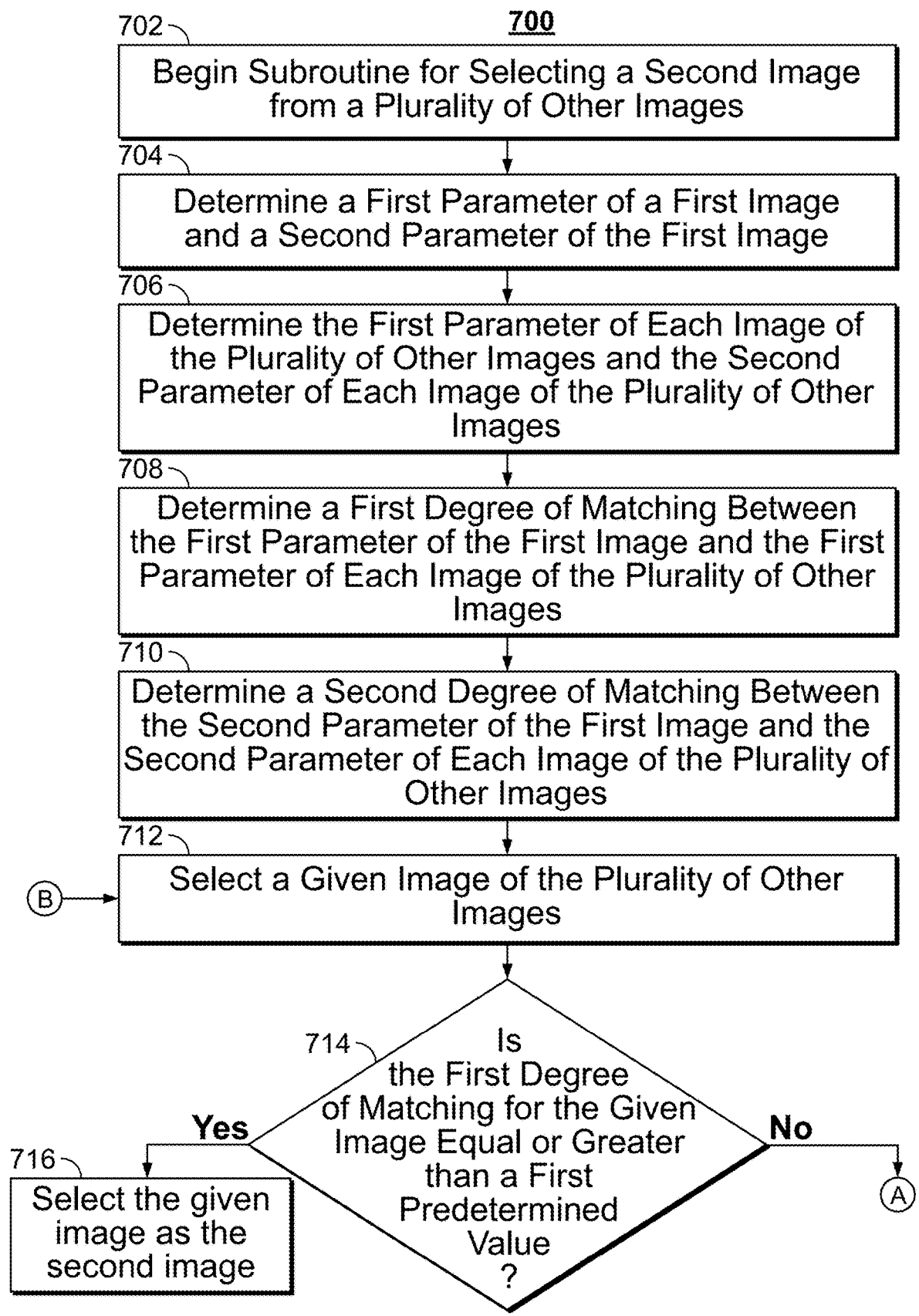
FIGS. 7A and 7B show a flowchart of another detailed illustrative process for selecting a second image from a plurality of other images, in accordance with some embodiments of the disclosure.
Figure 7B:
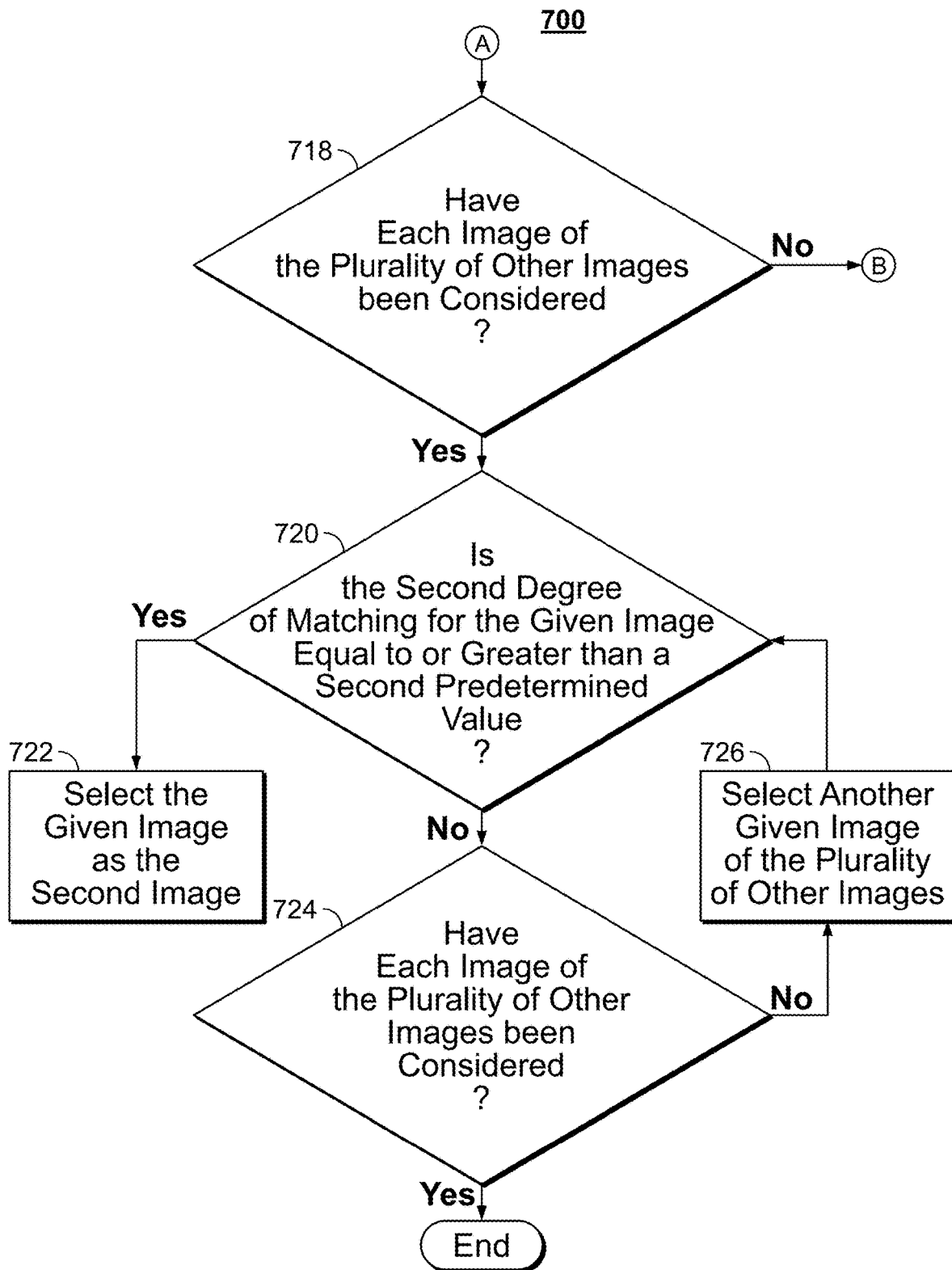

FIGS. 7A and 7B show another flowchart of a detailed illustrative process for selecting a second image from a plurality of other images 110, in accordance with some embodiments of the disclosure. A process 700 for selecting a second image from a plurality of other images 110 may begin at block 702. At block 704, the control circuitry 304 determines a first parameter of the image 104 and a second parameter of the image 104. For example, the control circuitry 304 may determine two or more of the parameters described above with reference to block 604. In some embodiments, the parameters are ranked in an order of importance, and the first parameter has a higher rank than the second parameter. For example, a point of view parameter may have a higher rank than an aspect ratio parameter, and thus the point of view parameter may be selected as the first parameter and the aspect ratio parameter may be selected as the second parameter. Those skilled in the art will appreciate that this example is merely illustrative, and that the parameters may be ranked in order of importance depending on the desired output. For example, in embodiments where realism of the generated new image (that is, that the generated new image should appear as if it was an original image and not a generated image), weather conditions, lighting conditions, and scale parameters may be ranked highly. In other embodiments where realism is less important but closeness of the images is more important, orientation, angle, and point of view parameters may be ranked higher than weather conditions or lighting conditions parameters.

At block 706, the control circuitry 304 determines the same first parameter and second parameter of each image of the plurality of other images 110 as was determined for the image 104 at block 704.

At block 708, the control circuitry 304 determines a first degree of matching between the first parameter of the image 104, as determined at block 704, and the first parameter of each image of the plurality of other images 110, as determined at block 706. For example, the control circuitry 304 may compare the first parameter of the image 104 and the first parameter of a given other image 110 to determine whether the parameters are an exact match, or whether the parameters differ. If the parameters differ, the control circuitry 304 determines an amount of the difference, and determines the degree of matching of the parameters based on the amount of difference. For example, some parameters may be binary (e.g., it is raining or it is not raining), and thus the amount of difference will be 1 or 0, which may result in a degree of matching of 0% or 100%, respectively. In another example, the parameter may have multiple thresholds (i.e., the point of view is exactly the same, or is off by 10%, 20%, etc.), and thus the amount of difference will be 0, 10, 20, etc., which may result in a degree of matching of 100%, 90%, 80%, etc. Those skilled in the art will recognize that these examples are merely illustrative and that various different parameters may have differences computable in different manners.

At block 710, the control circuitry 304 determines a second degree of matching between the second parameter of the image 104, as determined at block 704, and the second parameter of each image of the plurality of images 110, as determined at block 706. The control circuitry 304 may determine the second degree of matching in a similar manner to that of the first degree of matching described above with reference to block 708.

At block 712, the control circuitry 304 selects a given image of the plurality of other images 110. For example, the control circuitry 304 may generate a list of each image of the plurality of other images 110 and select the given image in the order of the list.

At block 714, the control circuitry 304 determines whether the first degree of matching for the given image is equal to or greater than a first predetermined value. For example, the control circuitry 304 may determine whether the first degree of matching between the first parameter of the image 104 and the first parameter of the given image, as determined at block 708, is a 90% or greater match. In response to determining that the first degree of matching for the given image is equal to or greater than the first predetermined value, the process 700 proceeds to block 716. In response to determining that the first degree of matching for the given image is not equal to or greater than the first predetermined value, the process 700 proceeds to block 718.

At block 716, the control circuitry 304 selects the given image as the second image.

At block 718, the control circuitry 304 determines whether each image of the plurality of other images 110 have been considered. For example, the control circuitry 304 may determine whether each of the images in the list generated at block 712 has been selected. In response to determining that each image of the plurality of other images 110 has not been considered, the process 700 returns to block 712 where another given image of the plurality of other images 110 is selected. In response to determining that each image of the plurality of other images has been considered, the process 700 proceeds to block 720.

At block 720, the control circuitry 304 determines whether the second degree of matching for the given image is equal to or greater than a second predetermined value. For example, the control circuitry 304 may determine whether the second degree of matching between the second parameter of the image 104 and the second parameter of the given image, as determined at block 710, is an 80% or greater match. In response to determining that the second degree of matching for the given image is equal to or greater than the second predetermined value, the process 700 proceeds to block 722. In response to determining that the second degree of matching for the given image is not equal to or greater than the second predetermined value, the process 700 proceeds to block 724.

At block 722, the control circuitry 304 selects the given image as the second image.

At block 724, the control circuitry 304 determines whether each image of the plurality of other images 110 have been considered. For example, the control circuitry 304 may determine whether each of the images in the list generated at block 712 has been considered at block 720. In response to determining that each image of the plurality of other images 110 has not been considered, the process 700 proceeds to block 726. In response to determining that each image of the plurality of other images has been considered, the process 700 ends.

At block 726, the control circuitry 304 selects another given image of the plurality of other images 110. For example, the control circuitry 304 may select a given image that has not yet been considered at block 720.

Figure 8:
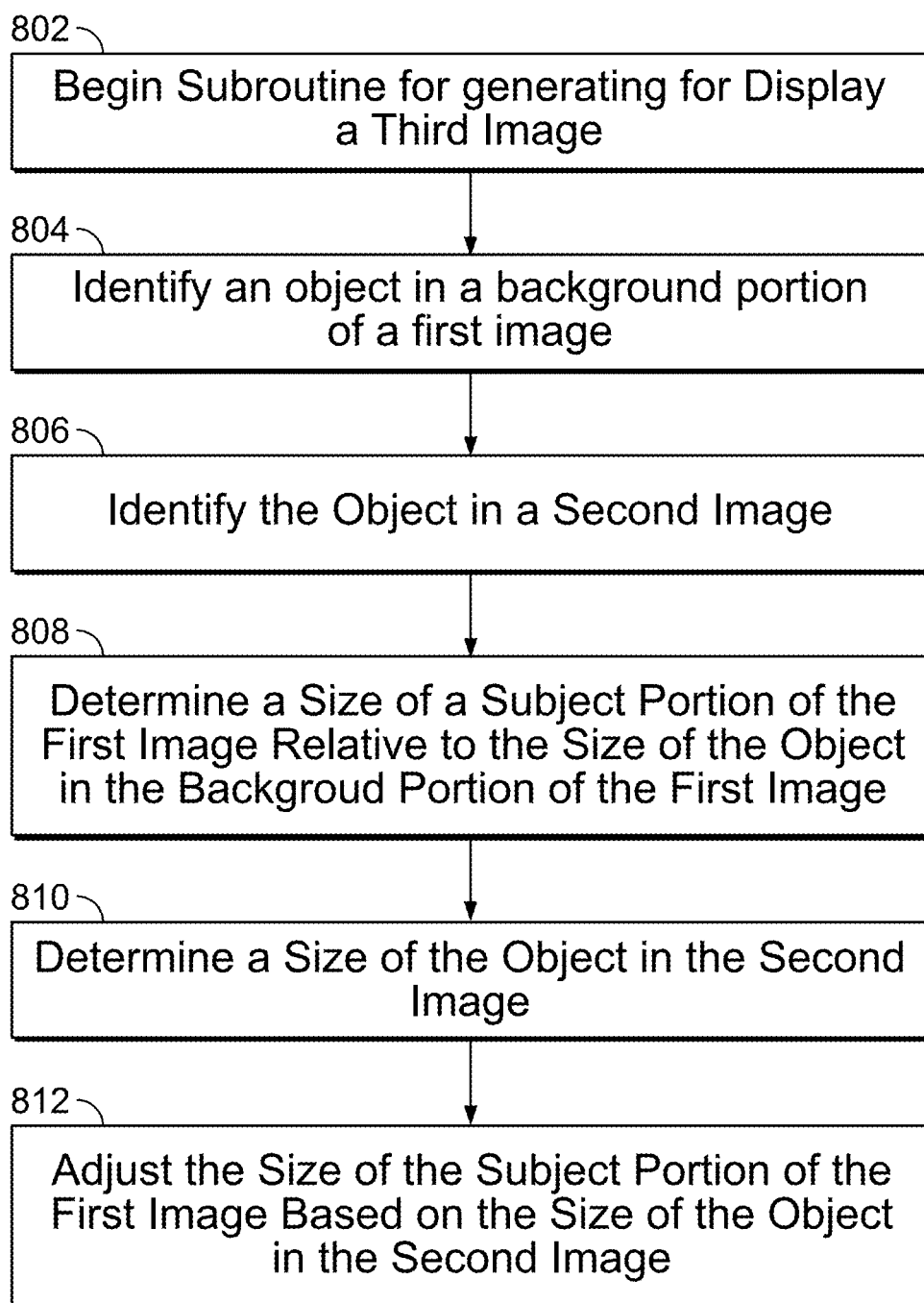
FIG. 8 is a flowchart of a detailed illustrative process for generating for display a third image, in accordance with some embodiments of the disclosure.

FIG. 8 is a flowchart of a detailed illustrative process for generating for display a third image, in accordance with some embodiments of the disclosure. A process 800 for generating for display a third image may begin at block 802. At block 804, the control circuitry 304 identifies an object in a background portion 106 of the image 104. The control circuitry 304 may use the same process for identifying an object in the background portion 106 of the image 104 as described above with reference to block 412.

At block 806, the control circuitry 304 identifies the object in a second image. The control circuitry 304 may apply the same process for object identification used on the image 104, as described at block 412, on the second image.

At block 808, the control circuitry 304 determines a size of the subject portion 108 of the image 104 relative to the identified object in the background portion 106 of the image 104. For example, the control circuitry 304 may determine the size of the subject portion 108 of the image 104 and determine the size of the object identified at block 804. The control circuitry 304 may then determine a difference between the size of the subject portion 108 and the size of the object, and/or determine a ratio of the size of the subject portion 108 to the size of the object.

At block 810, the control circuitry 304 determines a size of the object, as identified at block 806, in the second image. For example, the control circuitry 304 may determine an amount of pixels included in an area of the second image that depict the object.

At block 812, the control circuitry 304 adjusts the size of the subject portion 108 of the image 104 based on the size of the object in the second image, as determined at block 810. For example, the control circuitry 304 may adjust the size of the subject portion 108 such that the relative size of the subject portion 108 to the size of the object in the second image remains the same as the relative size of the subject portion 108 to the size of the object in the image 104, as determined at block 808.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for replacing a background portion of an image, the method comprising:
   receiving a first image;
   identifying a background portion of the first image and a subject portion of the first image;
   retrieving metadata associated with the first image;
   determining, based on the metadata, a geographic location where the first image was captured;
   identifying an object associated with the geographic location;
   determining whether the object is included in the background portion of the first image;
   in response to determining the object is included in the background portion of the first image, determining a point of view from which the first image was captured relative to the object;
   retrieving a plurality of other images captured at the geographic location;
   selecting a second image from the plurality of other images, wherein the second image is associated with metadata indicating that the second image was captured during a predetermined time period, and the second image depicts the object and was captured from the point of view; and
   generating for display a third image comprising the subject portion of the first image placed over the second image.

2. The method of claim 1, wherein retrieving the plurality of other images captured at the geographic location comprises:
   retrieving a plurality of images depicting the object.

3. The method of claim 2,
   wherein retrieving the plurality of images depicting the object comprises retrieving a plurality of images that depict the object and were captured from the point of view.

4. The method of claim 1, wherein selecting the second image from the plurality of other images comprises:
   determining a parameter of the first image;
   determining a parameter of the second image;
   determining whether the parameter of the first image matches the parameter of the second image; and
   in response to determining that the parameter of the first image matches the parameter of the second image, selecting the second image.

5. The method of claim 1, wherein selecting the second image from the plurality of other images comprises:
   determining a first parameter of the first image and a second parameter of the first image, wherein the first parameter has a higher ranking than the second parameter;
   determining the first parameter of each of the plurality of other images and the second parameter of each of the plurality of other images;

determining a first degree of matching between the first parameter of the first image and the first parameter of each of the plurality of other images;

determining a second degree of matching between the second parameter of the first image and the second parameter of each of the plurality of other images; and in response to determining that the first degree of matching for a given image of the plurality of other images is equal to or greater than a predetermined value, selecting the given image as the second image.

6. The method of claim 1, wherein selecting the second image from the plurality of other images comprises:

determining a first parameter of the first image and a second parameter of the first image, wherein the first parameter has a higher ranking than the second parameter;

determining the first parameter of each of the plurality of other images and the second parameter of each of the plurality of other images;

determining a first degree of matching between the first parameter of the first image and the first parameter of each of the plurality of other images;

determining a second degree of matching between the second parameter of the first image and the second parameter of each of the plurality of other images;

in response to determining that the first degree of matching for each of the plurality of other images is lower than a first predetermined value, determining whether the second degree of matching for a given image of the plurality of other images is equal to or greater than a second predetermined value; and in response to determining that the second degree of matching for the given image of the plurality of other images is equal to or greater than the second predetermined value, selecting the given image as the second image.

7. The method of claim 1, wherein selecting the second image from the plurality of other images comprises:

determining a time of day associated with the first image;

determining whether a given image of the plurality of other images is associated with the time of day; and in response to determining that the given image is associated with the time of day, selecting the given image as the second image.

8. The method of claim 1, wherein selecting the second image from the plurality of other images comprises:

identifying the object in the background portion of the first image;

determining whether a given image of the plurality of other images was captured from the point of view; and in response to determining that the given image was captured from the point of view, selecting the given image as the second image.

9. The method of claim 1, wherein generating for display the third image comprises:

identifying the object in the background portion of the first image;

identifying the object in the second image;

determining a size of the subject portion of the first image relative to the size of the object in the background portion of the first image;

determining a size of the object in the second image; and adjusting the size of the subject portion of the first image such that the size of the subject portion of the first image relative to the size of the object in the background portion of the first image and the size of the subject portion of the first image relative to the size of the object in the second image are equal.

10. The method of claim 1, wherein generating for display the third image comprises:

identifying a landmark associated with the geographic location;

determining a position of the landmark in the second image; and placing the subject portion of the first image over the second image such that the subject portion of the first image does not obscure the position of the landmark in the second image.

11. A system for replacing a background portion of an image, the system comprising:

control circuitry configured to:

receive a first image;

identify a background portion of the first image and a subject portion of the first image;

retrieve metadata associated with the first image;

determine, based on the metadata, a geographic location where the first image was captured;

identify an object associated with the geographic location;

determine whether the object is included in the background portion of the first image;

in response to determining the object is included in the background portion of the first image, determine a point of view from which the first image was captured relative to the object;

retrieve a plurality of other images captured at the geographic location;

select a second image from the plurality of other images, wherein the second image is associated with metadata indicating that the second image was captured during a predetermined time period, and the second image depicts the object and was captured from the point of view; and generate for display a third image comprising the subject portion of the first image placed over the second image.

12. The system of claim 11, wherein the control circuitry is configured to retrieve the plurality of other images captured at the geographic location by:

retrieving a plurality of images depicting the object.

13. The system of claim 12, wherein the control circuitry is configured to retrieve the plurality of images depicting the object by retrieving a plurality of images that depict the object and were captured from the point of view.

14. The system of claim 11, wherein the control circuitry is configured to select the second image from the plurality of other images by:

determining a parameter of the first image;

determining a parameter of the second image;

determining whether the parameter of the first image matches the parameter of the second image; and in response to determining that the parameter of the first image matches the parameter of the second image, selecting the second image.

15. The system of claim 11, wherein the control circuitry is configured to select the second image from the plurality of other images by:

determining a first parameter of the first image and a second parameter of the first image, wherein the first parameter has a higher ranking than the second parameter;

determining the first parameter of each of the plurality of other images and the second parameter of each of the plurality of other images;

determining a first degree of matching between the first parameter of the first image and the first parameter of each of the plurality of other images;

determining a second degree of matching between the second parameter of the first image and the second parameter of each of the plurality of other images; and in response to determining that the first degree of matching for a given image of the plurality of other images is equal to or greater than a predetermined value, selecting the given image as the second image.

16. The system of claim 11, wherein the control circuitry is configured to select the second image from the plurality of other images by:

determining a first parameter of the first image and a second parameter of the first image, wherein the first parameter has a higher ranking than the second parameter;

determining the first parameter of each of the plurality of other images and the second parameter of each of the plurality of other images;

determining a first degree of matching between the first parameter of the first image and the first parameter of each of the plurality of other images;

determining a second degree of matching between the second parameter of the first image and the second parameter of each of the plurality of other images;

in response to determining that the first degree of matching for each of the plurality of other images is lower than a first predetermined value, determining whether the second degree of matching for a given image of the plurality of other images is equal to or greater than a second predetermined value; and in response to determining that the second degree of matching for the given image of the plurality of other images is equal to or greater than the second predetermined value, selecting the given image as the second image.

17. The system of claim 11, wherein the control circuitry is configured to select the second image from the plurality of other images by:

determining a time of day associated with the first image;

determining whether a given image of the plurality of other images is associated with the time of day; and in response to determining that the given image is associated with the time of day, selecting the given image as the second image.

18. The system of claim 11, wherein the control circuitry is configured to select the second image from the plurality of other images by:

identifying the object in the background portion of the first image;

determining whether a given image of the plurality of other images was captured from the point of view; and in response to determining that the given image was captured from the point of view, selecting the given image as the second image.

19. The system of claim 11, wherein the control circuitry is configured to generate for display the third image by:

identifying the object in the background portion of the first image;

identifying the object in the second image;

determining a size of the subject portion of the first image relative to the size of the object in the background portion of the first image;

determining a size of the object in the second image; and adjusting the size of the subject portion of the first image such that the size of the subject portion of the first image relative to the size of the object in the background portion of the first image and the size of the subject portion of the first image relative to the size of the object in the second image are equal.

20. The system of claim 11, wherein the control circuitry is configured to generate for display the third image by:

identifying a landmark associated with the geographic location;

determining a position of the landmark in the second image; and placing the subject portion of the first image over the second image such that the subject portion of the first image does not obscure the position of the landmark in the second image.

* * * * *